(No Model.) 3 Sheets—Sheet 3.
J. C. BURNES.
STABLE APPLIANCE.
No. 599,763. Patented Mar. 1, 1898.
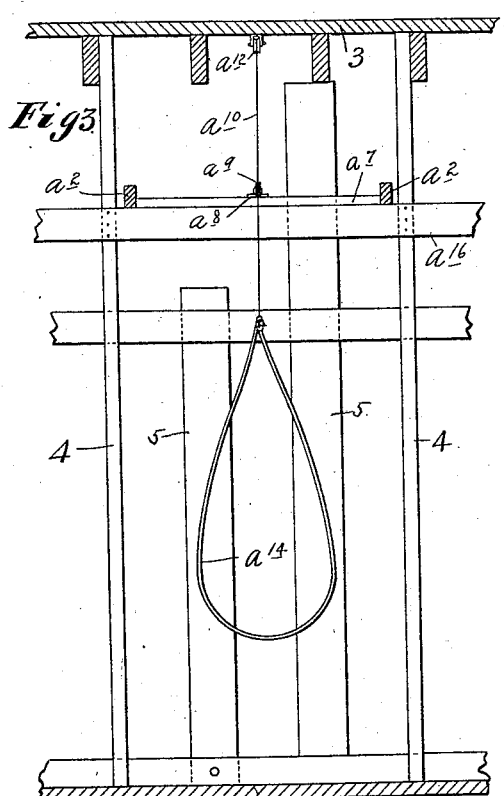
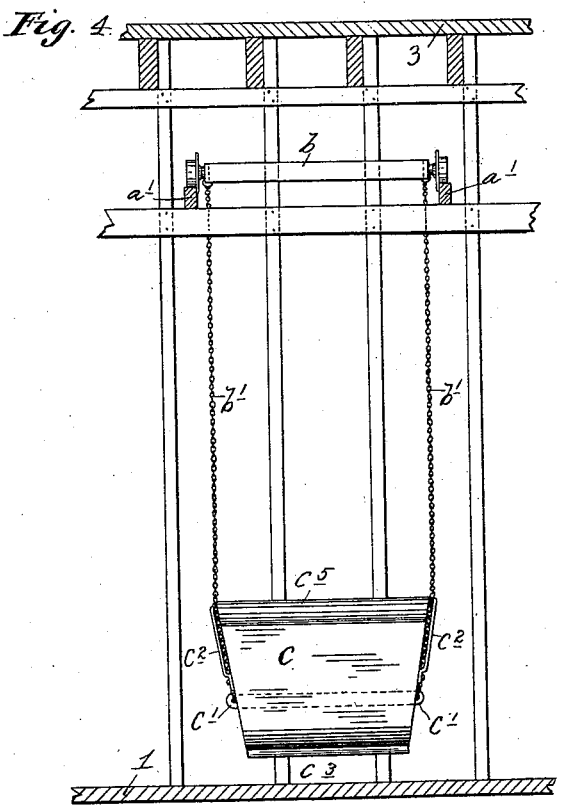
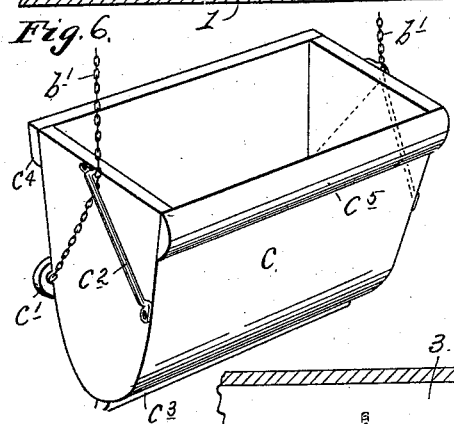
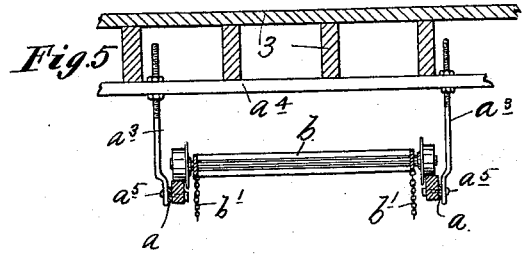
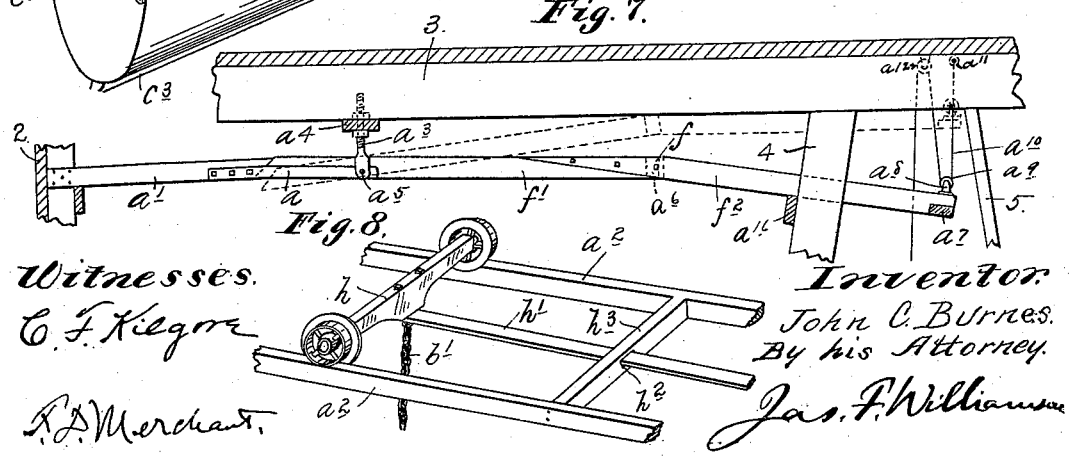
Witnesses
C. F. Kilgore
F. D. Merchant
Inventor
John C. Burnes.
By his Attorney
Jas. F. Williamson

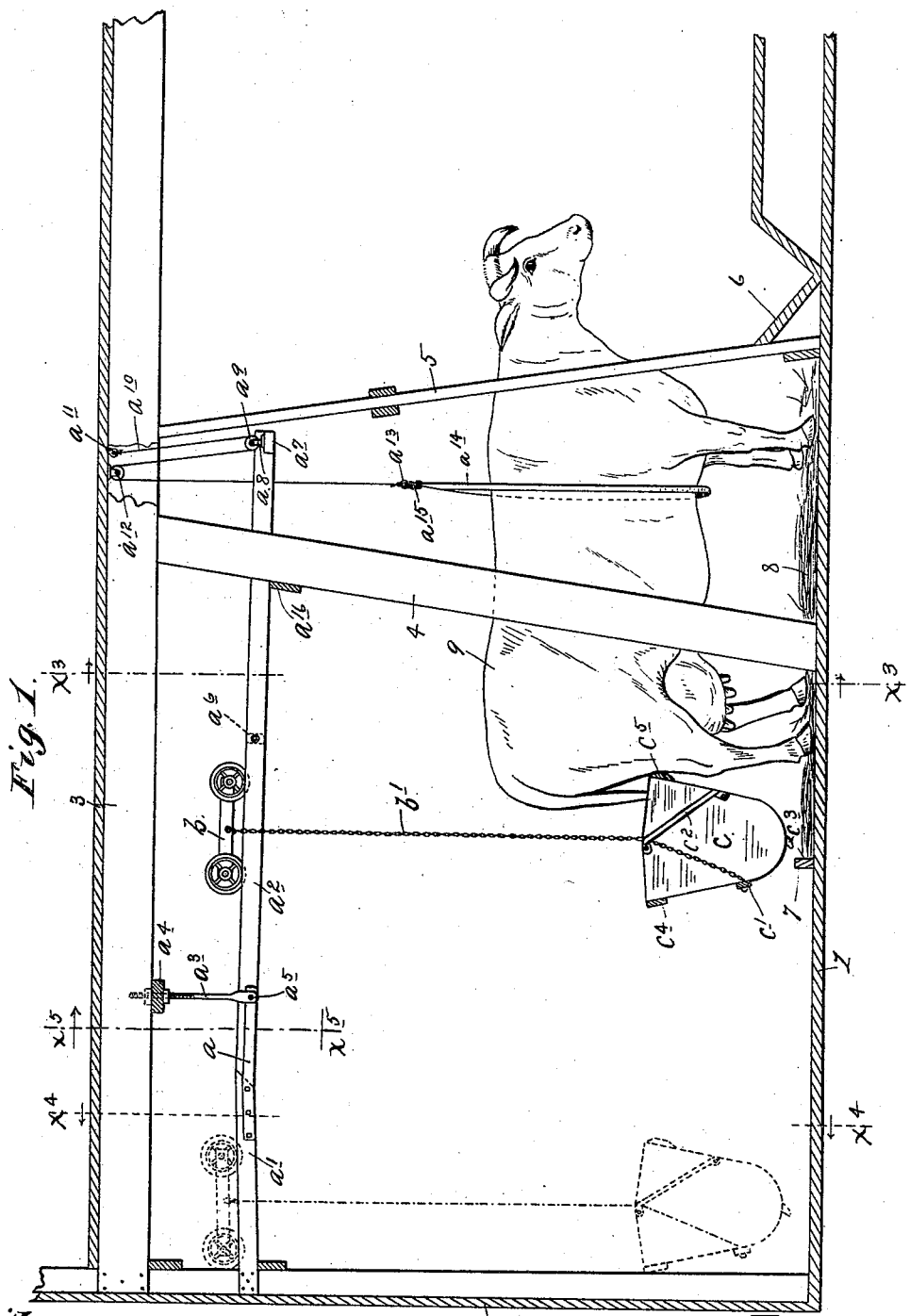

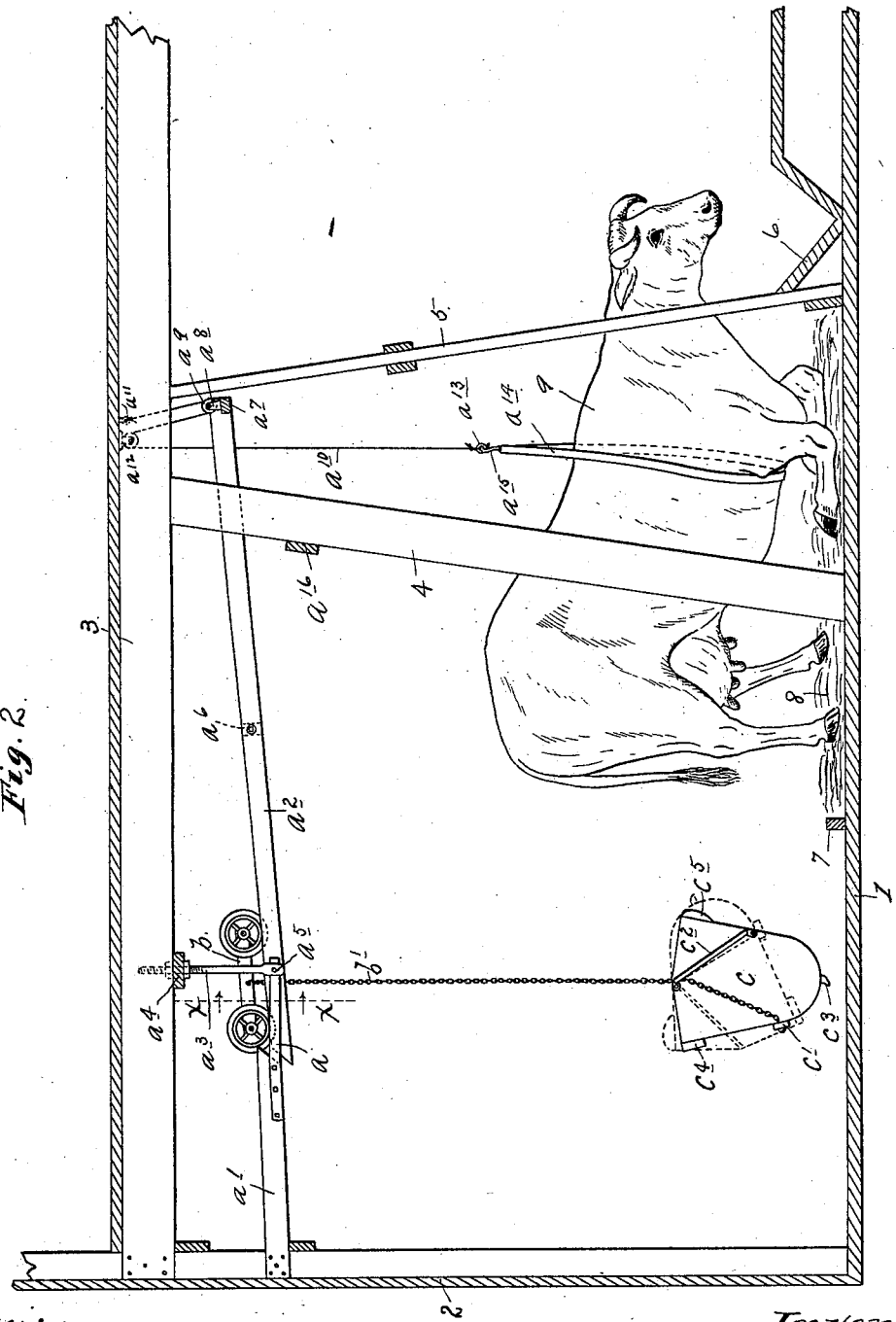

UNITED STATES PATENT OFFICE.

JOHN C. BURNES, OF HOPKINS, MINNESOTA.

STABLE APPLIANCE.

SPECIFICATION forming part of Letters Patent No. 599,763, dated March 1, 1898.

Application filed July 12, 1897. Serial No. 644,178. (No model.)

*To all whom it may concern:*

Be it known that I, JOHN C. BURNES, a citizen of the United States, residing at Hopkins, in the county of Hennepin and State of Minnesota, have invented certain new and useful Improvements in Stable Appliances; and I do hereby declare the following to be a full, clear, and exact description of the invention, such as will enable others skilled in the art to which it appertains to make and use the same.

My invention relates to stable appliances for cows or other animals, and has for its object to improve the same with a view of increased efficiency.

To this end my invention consists of the novel devices and combinations of devices which are hereinafter described, and defined in the claims.

The invention is illustrated in the accompanying drawings, wherein, like notations referring to like parts throughout the several views—

Figure 1 is a sectional elevation showing my device as the parts would appear when the cow is standing up. Fig. 2 is a similar view, but showing the parts as they would appear when the cow is in the act of lying down or getting up. Fig. 3 is a vertical section on the line $x^3\ x^3$ of Fig. 1. Fig. 4 is a vertical section on the line $x^4\ x^4$ of Fig. 1, with the parts in the position shown in dotted lines in Fig. 1. Fig. 5 is a detail in section on the line $x^5\ x^5$ of Fig. 1. Fig. 6 is a perspective of the pan or receptacle detached. Fig. 7 is a view in sectional elevation, with some parts broken away, illustrating a modification adapted for use on a low stall. Fig. 8 is a perspective showing a modification in the form of the truck from which the pan or receptacle is suspended.

The numerals 1, 2, 3, 4, 5, and 6 represent the well-known parts of an ordinary cattle-stall, wherein stanchions are employed to hold the animal in position. The stall is provided with the usual footboard or cleat 7 for retaining the bedding 8 in proper position within the stall for the use and protection of the animal 9.

Directing attention now to my invention, I provide in the stall an overhead track constructed in two sections, (marked $a'$ and $a^2$, respectively.) The section $a'$ is made fast at its rear ends to the vertical wall 2 of the stall and at its forward end is provided with projecting arms $a$, which in turn are supported at their forward ends from the overhead timbers 3 of the stall by means of hangers $a^3$, shown as bolted to cross-pieces $a^4$, attached to said overhead timbers 3. The same pins or pivot-bolts $a^5$ which connect the hangers $a^3$ with the arms $a$ of the fixed track-section $a'$ extend through the rails of the track-section $a^2$ and constitute pivots on which the forward or movable section $a^2$ of the track may move in the vertical plane. The two rails of the forward section $a^2$ are suitably braced by a cross-piece or tie-bar $a^6$, shown as located near the center of the same, and by a forward cross-piece or tie-bar $a^7$, connecting the forward ends of the rails. To the cross-bar $a^7$ is fixed a bearing-bracket $a^8$, in which is mounted a sheave or pulley $a^9$. A flexible connection $a^{10}$ is attached to an eyebolt $a^{11}$ or other device fixed to the overhead part of the stall and passes thence under the sheave $a^9$ and back to an overhead sheave $a^{12}$ and thence downward to a ring or eyepiece $a^{13}$. To this ring $a^{13}$ is attached one end of a surcingle or strap $a^{14}$, which is provided with a hook $a^{15}$ at its free end. The surcingle $a^{14}$ is adapted to be passed around the body of the cow 9, with its hook $a^{15}$ engaging the ring $a^{13}$, as shown in Figs. 1 and 2.

When the animal is in an upright position, the forward or pivoted section $a^2$ of the track will be supported at its forward end by a cross-bar $a^{16}$, fixed to the timbers 4 of the stall. This cross-piece $a^{16}$ is fixed to said timbers 4 in proper position to support the forward section $a^2$ of the track at a slight forward inclination toward the head of the stall, as clearly shown in Fig. 1.

The fixed section $a'$ of the track is set on a slight rearward inclination toward the back of the stall from the point of junction with the rear ends of the rails of the pivoted track-section $a^2$. To secure this result, the arms $a$, connecting the rail of the track-section $a'$ with the hangers $a^3$, are not straight throughout, but are bent to afford parts in two different planes. The adjoining ends of the rails of the two track-sections $a'$ and $a^2$ are reversely beveled, so as to unite with a lap-joint when the parts are in the position shown in Fig. 1, while affording a free downward movement to the rails of the section $a^2$ rearward of the pivot-bolts $a^5$, as shown in Fig. 2.

On the overhead track in the stall I mount a suitable small truck $b$. As shown in the main views and as preferred by me, this is a four-wheeled truck with flanged wheels resting on the rails of the track in the same way as an ordinary car-truck. From the truck $b$, by chains $b'$ or other suitable flexible connections, I suspend the pan or receptacle $c$. As shown, this pan $c$ is provided below its center of gravity with a cross-piece $c'$ at its back, the ends of which extend outward beyond the side walls of the receptacle. The chains $b'$ are attached to these laterally-projecting ends of the cross-bar $c$ and pass upward under staple-like corner-irons $c^2$, which are secured to the side walls of the receptacle in a diagonal position, as shown best in Figs. 1, 2, and 6. This manner of suspending the receptacle from the chains $b'$ insures the vertical position of the bucket when under the action of gravity alone, as shown in Figs. 1 and 2 in full lines, but permits the receptacle to be readily turned on the chains, as shown in dotted lines in Fig. 2, whenever so desired, for dumping the bucket. The bucket or receptacle $c$ is provided with a bottom cross-piece $c^3$, which serves as a convenient handle when dumping the same. It is also provided with a top reinforcing cross-bar $c^4$ for engagement over the side-boards of the wheelbarrow or other portable device into which the bucket is to be dumped. The said bucket $c$ is also provided with a rounded cross-piece $c^5$ at the top of its front wall for bearing against the animal's legs.

Having regard now to the action of my device the operation will be readily understood from an inspection of Figs. 1 and 2. When the animal is in an upright position, the truck $b$ will be on the forward or pivoted section $a^2$ of the track, and under the action of gravity the truck and bucket will assume the position shown in Fig. 1, as required for the proper use of the receptacle. At this time it should be observed that there is no strain whatever on the animal from the track or any part of the appliance. The forward end of the pivoted track-section rests at that time on the cross-piece $a^{16}$ and takes the weight of the truck and the suspended bucket. The surcingle $a^{14}$ will stand entirely free from the body of the animal, as clearly shown in Fig. 1. Whenever the animal lies down, as she is shown about to do in Fig. 2, the lowering of her body, acting through the surcingle $a^{14}$ and the flexible connection $a^{10}$, will raise the forward end of the pivoted track-section $a^2$ to its uppermost limit, so as to reverse the inclination of the track, and thereby causing the truck and the bucket $c$ to move by gravity rearward into the position shown in Fig. 2. When the parts are brought into the position shown in Fig. 2, it will be seen that the two sections of the track $a'$ and $a^2$ break joints or assume a staggered relation in the vertical plane at their rear ends. Hence the truck $b$ can only move backward until its rear wheels abut against the forward ends of the rails of the fixed track-section $a'$. The truck will therefore not pass off from the pivoted section $a^2$ of the track. The arms $a$, projecting from the fixed track-section, extend forward a distance greater than one-half of the length of the truck $b$, or, otherwise stated, the parts are so proportioned and arranged that when the truck is in the position shown in Fig. 2 the pivotal centers of the forward track-section $a^2$ will be forward of the chains $b'$ or other flexible connections, suspending the bucket $c$ from the truck $b$. It follows, therefore, that when the parts are in the position shown in Fig. 2 the center of gravity of the load on the truck $b$ from the bucket $c$ will be rearward of the pivotal centers $a^5$ of the track-section $a^2$ and will assist to support the forward end of said track-section $a^2$ in its uppermost position. The parts are so proportioned that the part of the track-section $a^2$ forward of the pivotal centers $a^5$ will slightly overbalance any possible load from the bucket $c$ on the truck $b$ when the parts are in the position shown in Fig. 2. From the construction described it follows that when the cow is about to lie down the bucket runs rearward by gravity into a position out of her road, and when she is lying down her only strain from the appliance is a small part of the forward section of the track. As before indicated, this is simply that part of the weight of the track-section $a^2$ which is unbalanced by the truck and the bucket when the parts are in the position shown in Fig. 2. Whenever the animal rises to an upright position, the forward end of the pivoted track-section $a^2$ will lower until intercepted by the cross-piece $a^{16}$, thereby causing the truck and bucket to assume their normal or working positions under the action of gravity, as shown in Fig. 1. The incline on the track-section $a^2$ when in the position shown in Fig. 1 is barely sufficient to insure the forward movement of the truck and bucket into working position under the action of gravity. Hence the weight pressing against the legs of the animal is very slight. When the animal is in an upright position, the two track-sections $a'$ $a^2$ unite in such a way as to afford a continuous track, and hence whenever desired for milking the cow or for other purposes the truck and the bucket can be readily moved backward to their limit into the position shown in dotted lines in Fig. 1.

It sometimes happens that the stalls of the stable are very low. To meet such conditions, I provide the slight modification which is illustrated in Fig. 7. By inspection of said view it will be seen that all the parts are identical with those already described with the exception of the forward or pivoted track-section. In the main views already considered the rails of the pivoted track-section $a^2$ are continuous in a common plane; but in the modification shown in Fig. 7 I construct the forward or pivoted sections of the track with rails formed in two sections $f'$ $f^2$, which meet at the point $f$, but are so set in respect to each other as to extend in different and convergent planes. Otherwise stated, the forward sections $f^2$ of said rails $f'$ $f^2$ are so set in respect to the sections $f'$ that when the pivoted section of the track is in its uppermost position the rail-sections $f^2$ will be parallel with the top timbers 3 of the stall, as shown in dotted lines in Fig. 7. The joint $f$ between the rail-sections $f'$ and $f^2$ is located at a point forward of the extreme limit of the truck's forward travel. Otherwise stated, the truck never passes onto the rail-sections $f^2$. It is sufficient to reverse the direction of the truck's travel to shift that part of the pivoted track-section formed by the rail-sections $f'$. It follows that the angular distance through which the rail-sections $f'$ need to be shifted is less than the distance through which the forward ends of the rails forming the pivoted track-section $a^2$ need to be shifted when the rails are in a continuous plane, as shown in the main view. The modified form of track-section shown in Fig. 7 can therefore be used in stalls which are too low to permit the use of the form shown in the main views.

In Fig. 8 I have shown a modification wherein, instead of a double truck, as in the main views, I provide a single truck $h$, and to the axle of the single truck I attach a guide-tongue $h'$, which extends forward through a suitable passage $h^2$ in a guide-bar $h^3$, connecting the two track-rails and serving as a central cross-tie for the same. This guiding cross tie or bar $h^3$ is applied, of course, to connect the rails of the pivoted track-section $a^2$. Hence under the pivotal movement of the pivoted track-section the guiding cross-bar $h^3$ sustains a constant relation to the axle of the truck $h$ and the tongue $h'$, thereby serving to guide the truck in its forward and backward movements without binding. The guide-passage $h^2$ is made relatively large as compared to the tongue $h'$. Hence when the parts are in the position shown in Fig. 1 the truck can be run back to its limit, so as to occupy a position corresponding to that shown for the preferred form in dotted lines in said views. The play in the guide-slot $h^2$ readily compensates for the slight change in the angular position of the truck relative to the pivoted track-section $a^2$ when the truck is on the fixed track-section $a'$.

By actual usage I have demonstrated the efficiency of the appliance herein disclosed for the purposes had in view.

Upon analysis of the construction described it will be seen that the same operates on a new principle as compared with any devices hitherto employed for the like purpose, so far as known to me. In the prior constructions, so far as known to me, the load was in some cases pulled in both directions by the animal, and in all cases the load was pulled and held in its rearmost position by the animal when lying down. In other words, either during the whole or a part of the time the load was supported by the animal. In my device, as already made clear, the load is never supported by the animal and moves both in its forward and in its rearward travel solely under the action of gravity. With my device the utmost that the animal ever has to sustain is a small fraction of the weight of the pivoted track-section when lying down, and this is so small as to be of no annoyance whatever to the animal.

It will be understood that some of the details of the construction shown and described might be varied without departing from the spirit of my invention.

What I claim, and desire to secure by Letters Patent of the United States, is as follows:

1. The combination with a stable-stall, of an overhead track normally supported independently of the animal, at a forward inclination, a truck on said track, a receptacle suspended from said truck, and means controllable by the animal for reversing the inclination of the track, when the animal lies down, whereby said receptacle is gravity-actuated in each direction of its travel, substantially as described.

2. The combination with a stable-stall, of an overhead pivoted track normally supported at a forward inclination, a truck on said track, a receptacle suspended from said truck, and connections operative by the animal, when lying down, to tilt said track on its pivotal center and reverse the inclination thereof, substantially as and for the purposes set forth.

3. The combination with a stable-stall, of an overhead track pivoted intermediate its extremities and normally supported independently of the animal, at a forward inclination, a truck on said track, a receptacle suspended from said truck, connections from the track operative by the animal, when lying down, to reversely tilt the track, with the parts so proportioned that the load, when in its rearmost position, will assist to hold the track in its backwardly-inclined position, substantially as described.

4. The combination with a stable-stall, of an overhead track composed of a fixed and a pivoted section, with the pivoted section normally supported independently of the animal at a forward incline, and forming a continuous track with said fixed section, but adapted to assume a staggered relation to said fixed section, in the vertical plane, when tilted to a backward inclination, a truck on said track, a receptacle suspended from said truck, and connections operative by the animal, when lying down, to reverse the inclination of the pivoted track-section, whereby the load is gravity-actuated in each direction of its travel, and the fixed track-section serves as a stop to limit the rearward travel of the load, substantially as described.

5. The combination with a stable-stall, of an overhead track composed of a fixed and a pivoted section, with the fixed section supported at a backward incline, in respect to the pivoted section, a truck on said track, and a receptacle suspended from said truck, whereby, when run onto the fixed section, the load will remain at the rear end of the same under the action of gravity, substantially as described.

6. The combination with a stable-stall, of the fixed track-section $a'$ set on a backward incline and having the horizontal arms $a$, the hangers $a^3$, the pivoted track-section $a^2$, the cross-piece or rest $a^{16}$, the truck $b$, the bucket $c$ suspended from said truck, the surcingle $a^{14}$, and the flexible connection $a^{10}$ operating over guide-sheaves $a^9$ $a^{12}$, all substantially as and for the purposes set forth.

7. The combination with a receptacle, of suspending-chains attached to the receptacle below and rearward of its center of gravity, and guides for said chains disposed diagonally across the forward corners of said receptacle, above and forward of its center of gravity, substantially as and for the purposes set forth.

8. The combination with the stable-stall, of the overhead track composed of the fixed and the pivoted section arranged as described, connections controllable by the cow for reversing the inclination of the pivoted track-section, when the cow lies down, the truck $b$ on the said track, the bucket $c$, the chains $b'$ suspending said bucket from said truck, with said chains attached to said bucket by the cross-bar $c$ located below the bucket's center of gravity, the guide $c^2$ for said chains arranged as described, and the bottom cross-piece or handle $c^3$, all substantially as and for the purposes set forth.

In testimony whereof I affix my signature in presence of two witnesses.

JOHN C. BURNES.

Witnesses:
JAS. F. WILLIAMSON,
BESSIE B. NELSON.